US011050366B2

(12) United States Patent
Yamauchi et al.

(10) Patent No.: US 11,050,366 B2
(45) Date of Patent: Jun. 29, 2021

(54) ACTUATOR DEVICE AND CONTROLLER FOR THE ACTUATOR DEVICE

(71) Applicant: DENSO CORPORATION, Kariya (JP)

(72) Inventors: Takuma Yamauchi, Kariya (JP); Eitaro Tanaka, Kariya (JP); Haruhiko Watanabe, Kariya (JP); Goro Ueda, Kariya (JP)

(73) Assignee: DENSO CORPORATION, Kariya (JP)

( * ) Notice: Subject to any disclaimer, the term of this patent is extended or adjusted under 35 U.S.C. 154(b) by 119 days.

(21) Appl. No.: 16/296,344

(22) Filed: Mar. 8, 2019

(65) Prior Publication Data

US 2019/0207538 A1 Jul. 4, 2019

Related U.S. Application Data

(63) Continuation of application No. PCT/JP2017/027189, filed on Jul. 27, 2017.

(30) Foreign Application Priority Data

Sep. 12, 2016 (JP) .............................. JP2016-177273

(51) Int. Cl.
*H02N 10/00* (2006.01)
*F03G 7/06* (2006.01)
(Continued)

(52) U.S. Cl.
CPC ............. *H02N 10/00* (2013.01); *F03G 7/065* (2013.01); *G01N 25/56* (2013.01); *H02N 11/006* (2013.01); *F05C 2251/08* (2013.01)

(58) Field of Classification Search
CPC ........ H02N 10/00; H02N 3/00; H02N 11/006; F03G 7/065; F03G 7/00; G01N 25/56; F05C 2251/08
(Continued)

(56) References Cited

U.S. PATENT DOCUMENTS 4,930,494 A * 6/1990 Takehana ........... A61B 1/00147
600/145
7,056,297 B2 * 6/2006 Dohno ............. A63B 21/00181
310/316.01
(Continued)

FOREIGN PATENT DOCUMENTS

JP S61190178 A 8/1986
JP H01262373 A 10/1989
(Continued)

OTHER PUBLICATIONS

Haines et al., "Artificial Muscles from Fishing Line and Sewing Thread", DOI: 10.1126/science.1246906, Feb. 21, 2014, vol. 343, Science, www.sciencemag.org, pp. 868-872.

*Primary Examiner* — Ahmed Elnakib
(74) *Attorney, Agent, or Firm* — Harness, Dickey & Pierce, P.L.C.

(57) ABSTRACT

An actuator device includes an actuator member, a drive subject, a first drive device and a second drive device. The actuator member is configured to be deformed in response to application of energy to the actuator member from an outside. The drive subject is coupled to the actuator member. The first drive device is configured to apply the energy to the actuator member and thereby displace the drive subject in a deforming direction of the actuator member. The second drive device is configured to displace the drive subject in a different direction that is different from the deforming direction of the actuator member.

6 Claims, 15 Drawing Sheets

(51) Int. Cl.
*G01N 25/56* (2006.01)
*H02N 11/00* (2006.01)

(58) Field of Classification Search
USPC .......................................................... 310/306
See application file for complete search history.

(56) References Cited

U.S. PATENT DOCUMENTS

| 10,174,745 | B2* | 1/2019 | Gurley | H02P 31/00 |
| 2003/0079472 | A1* | 5/2003 | Hara | F03G 7/065 |
| | | | | 60/527 |
| 2008/0034750 | A1* | 2/2008 | Gao | H02N 2/10 |
| | | | | 60/527 |
| 2014/0060036 | A1* | 3/2014 | Gao | F01P 7/10 |
| | | | | 60/527 |
| 2015/0219078 | A1* | 8/2015 | Li | H02N 10/00 |
| | | | | 310/306 |
| 2019/0207538 | A1* | 7/2019 | Yamauchi | H02N 11/006 |
| 2019/0214924 | A1* | 7/2019 | Yamauchi | F03G 7/06 |

FOREIGN PATENT DOCUMENTS

| JP | 2003111458 | A | 4/2003 |
| JP | 2015533521 | A | 11/2015 |
| JP | 2016042783 | A | 3/2016 |
| WO | WO-2002-098618 | A1 | 12/2002 |
| WO | WO-2014022667 | A2 | 2/2014 |

\* cited by examiner

ACTUATOR DEVICE AND CONTROLLER FOR THE ACTUATOR DEVICE

CROSS REFERENCE TO RELATED APPLICATIONS

This application is a continuation application of International Patent Application No. PCT/JP2017/027189 filed on Jul. 27, 2017, which designated the United States and claims the benefit of priority from Japanese Patent Application No. 2016-177273 filed on Sep. 12, 2016. The entire disclosures of all of the above applications are incorporated herein by reference.

TECHNICAL FIELD

The present disclosure relates to an actuator device.

BACKGROUND

Previously, there is known an actuator device that uses an actuator member as a power source while the actuator member is configured to be deformed in response to application of energy to the actuator member from an outside by an electrical means, a photonic means, a chemical means, a thermal means, absorbing means or another means.

SUMMARY

According to the present disclosure, there is provided an actuator device that includes an actuator member and a drive subject. The actuator member is configured to be deformed in response to application of energy to the actuator member from an outside of the actuator member. The drive subject is coupled to the actuator member.

BRIEF DESCRIPTION OF DRAWINGS

The present disclosure, together with additional objectives, features and advantages thereof, will be best understood from the following description in view of the accompanying drawings.

DETAILED DESCRIPTION

Figure 1:
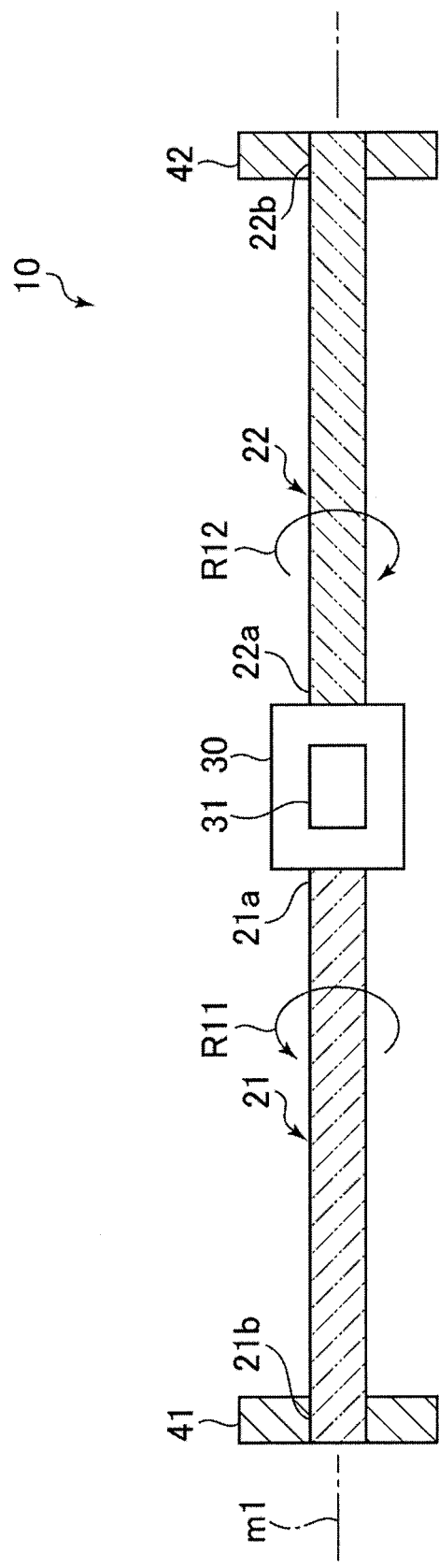
FIG. 1 is a diagram schematically showing a structure of an actuator device according to a first embodiment.

An actuator member of the previously known actuator device has a characteristic of that the actuator member is torsionally deformed or is elongated in response to a temperature change caused by electric heating or heating by a white-light lamp.

When the actuator member is cooled by natural cooling after heating of the actuator member, the actuator member is deformed in an opposite direction that is opposite from a deforming direction of the actuator member deformed at the time of heating the actuator member. Therefore, when the actuator member is heated and is cooled in a state where a drive subject is coupled to the actuator member, the drive subject can be reciprocated.

However, when the actuator member is cooled by the natural cooling, a change in the temperature of the actuator member naturally progresses. This causes a difference between a displacement speed of the actuator member at the time of heating and a displacement speed of the actuator member at the time of cooling, and thereby it is difficult to obtain a stable reciprocating movement of the drive subject.

According to one aspect of the present disclosure, an actuator device includes an actuator member, a drive subject, a first drive device and a second drive device. The actuator member is configured to be deformed in response to application of energy to the actuator member from an outside of the actuator member. The drive subject is coupled to the actuator member. The first drive device is configured to apply the energy to the actuator member and thereby displace the drive subject in a deforming direction of the actuator member. The second drive device is configured to displace the drive subject in a different direction that is different from the deforming direction of the actuator member.

With the above construction, the drive subject can be displaced in the deforming direction of the actuator member by applying the energy from the first drive device to the actuator member. Furthermore, the drive subject can be displaced by the second drive device in the different direction that is different from the deforming direction of the actuator member. Thereby, the first drive device and the second drive device can control the reciprocating movement of the drive subject in a first direction and a second direction, so that the reciprocating movement of the drive subject can be stabilized.

Hereinafter, various embodiments of the present disclosure will be described with reference to the drawings. In the following embodiments, substantially identical parts are indicated by the same reference signs and will not be described redundantly for the sake of simplicity.

First Embodiment

Hereinafter, an actuator device according to a first embodiment will be described with reference to the drawings. In order to facilitate the understanding of the description, the same reference signs are attached to the same constituent elements in each drawing as much as possible, and redundant explanations of these elements are omitted.

As shown in FIG. 1, the actuator device 10 of the present embodiment includes a first actuator member 21, a second actuator member 22, a drive subject 30, a first holder 41 and a second holder 42.

The first actuator member 21 and the second actuator member 22 are connected in series while the drive subject 30 is interposed between the first actuator member 21 and the second actuator member 22. Each actuator member 21, 22 is made of a member in a form of a wire that is placed along an axis m1. Each actuator member 21, 22 is made of polymer fibers, such as polyamide fibers. A metal plating, such as a silver plating, is formed at a surface of each actuator member 21, 22. Each actuator member 21, 22 can be heated by conducting an electric current through the metal plating formed at the surface of the actuator member 21, 22. Each actuator member 21, 22 has a characteristic of being torsionally deformable about the axis m1 in response to application of heat energy to the actuator member 21, 22 through heating.

Specifically, as indicated by dot-dot-dash lines in the drawing, an orientation direction of polyamide molecules, which are constituent molecules of the first actuator member 21, is a spiral direction that is spiral about the axis m1 while the spiral direction is tilted relative to the axis m1 by a predetermined angle. Thereby, the first actuator member 21 has the following torsionally deforming characteristic. Specifically, the first actuator member 21 is torsionally deformed in a first direction R11 about the axis m1 in response to application of the heat energy to the first actuator member 21 through the heating and is torsionally deformed in an opposite direction that is opposite from the first direction R11 upon cooling of the first actuator member 21 through, for example, natural cooling. Specifically, the deforming direction of the first actuator member 21 is the first direction R11.

In contrast, an orientation direction of polyamide molecules, which are constituent molecules of the second actuator member 22, is a spiral direction that is spiral about the axis m1 while the spiral direction is tilted in an opposite direction, which is opposite from the orientation direction of the polyamide molecules of the first actuator member 21, relative to the axis m1 by the predetermined angle. In this way, the second actuator member 22 is torsionally deformed in a second direction R12, which is opposite from the first direction R11, in response to the application of the heat energy to the second actuator member 22 through the heating and is torsionally deformed in the opposite direction, which is opposite from the second direction R12, upon cooling of the second actuator member 22 through, for example, the natural cooling. Specifically, the deforming direction of the second actuator member 22 is the second direction R12. A shape of a cross section of the second actuator member 22 and a length of the second actuator member 22 are the same as a shape of a cross section of the first actuator member 21 and a length of the first actuator member 21.

The drive subject 30 is coupled to one end part 21a of the first actuator member 21. Therefore, when the first actuator member 21 is torsionally deformed in the first direction R11, a rotational force is applied to the drive subject 30 in the first direction R11. Thereby, the drive subject 30 is rotationally displaced in the first direction R11.

The drive subject 30 is also coupled to one end part 22a of the second actuator member 22. Therefore, when the second actuator member 22 is torsionally deformed in the second direction R12, a rotational force is applied to the drive subject 30 in the second direction R12. Thereby, the drive subject 30 is rotationally displaced in the second direction R12.

A sensor device 31 is fixed to the drive subject 30. The sensor device 31 is, for example, a device, which senses a required physical quantity, or an image capturing device. The sensor device 31 is configured to be rotationally displaced in the first direction R11 and the second direction R12 together with the drive subject 30. The drive subject 30 is supported by a support mechanism (not shown) in a manner that enables rotation of the drive subject 30 about the axis m1.

The first holder 41 is fixed to an outer peripheral surface of an opposite end part 21b of the first actuator member 21, which is opposite from the end part 21a of the first actuator member 21 coupled to the drive subject 30. The first holder 41 is fixed to, for example, a housing (not shown). The first holder 41 holds the first actuator member 21.

The second holder 42 is fixed to an outer peripheral surface of an opposite end part 22b of the second actuator member 22, which is opposite from the end part 22a of the second actuator member 22 coupled to the drive subject 30. The second holder 42 is fixed to, for example, the housing (not shown). The second holder 42 holds the second actuator member 22. The first holder 41 and the second holder 42 also have a function of holding the drive subject 30 through the first actuator member 21 and the second actuator member 22.

Next, an electrical structure of the actuator device 10 will be described.

Figure 2:
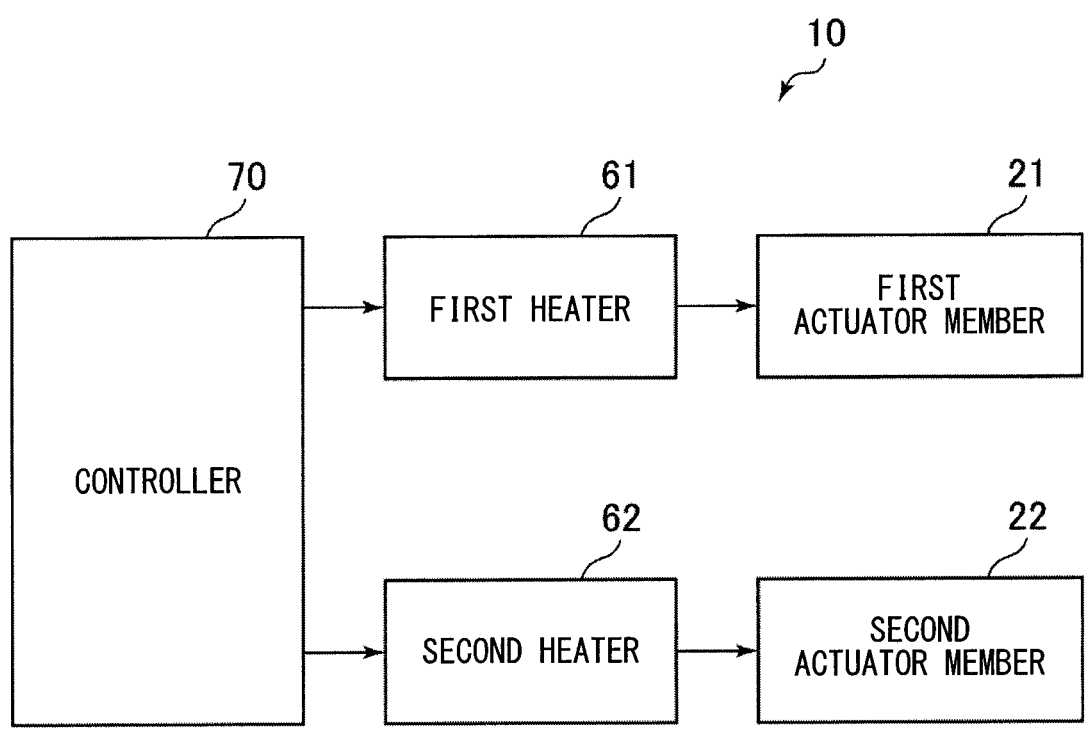
FIG. 2 is a block diagram showing an electrical structure of the actuator device of the first embodiment.

As shown in FIG. 2, the actuator device 10 further includes a first heater (first heating device) 61, a second heater (second heating device) 62 and a controller 70.

The first heater 61 supplies the electric current to the metal plating of the first actuator member 21, so that the first actuator member 21 is heated by Joule heat. In this way, the first actuator member 21 is torsionally deformed in the first direction R11, and thereby the drive subject 30 is rotationally displaced in the first direction R11. As discussed above, in the view taken from the first actuator member 21, the first heater 61 of the present embodiment functions as a first drive device that displaces the drive subject 30 in the deforming direction of the first actuator member 21 by applying the energy to the first actuator member 21. Furthermore, in the view taken from the second actuator member 22, the first heater 61 also functions as a second drive device that displaces the drive subject 30 in the different direction, which is different from the deforming direction of the second actuator member 22, specifically, the opposite direction, which is opposite from the deforming direction of the second actuator member 22.

The second heater 62 supplies the electric current to the metal plating of the second actuator member 22, so that the second actuator member 22 is heated by Joule heat. In this way, the second actuator member 22 is torsionally deformed in the second direction R12, and thereby the drive subject 30 is rotationally displaced in the second direction R12. Thereby, in a view taken from the second actuator member 22, the second heater 62 of the present embodiment functions as a first drive device that displaces the drive subject 30 in the deforming direction of the second actuator member 22 by applying the energy to the second actuator member 22. Furthermore, in a view taken from the first actuator member 21, the second heater 62 also functions as a second drive device that displaces the drive subject 30 in the different direction, which is different from the deforming direction of the first actuator member 21, specifically, the opposite direction, which is opposite from the deforming direction of the first actuator member 21.

The controller 70 executes an orientation control operation that changes the orientation of the drive subject 30 in the first direction R11 and the second direction R12 by individually heating the first actuator member 21 and the second actuator member 22 through the first heater 61 and the second heater 62. The controller 70 includes a microcomputer, which includes, for example, a CPU, a ROM and a RAM and serves as a main component of the controller 70. The CPU executes computing processes that relate to the orientation control operation of the drive subject 30. The ROM stores, for example, programs and data required for the orientation control operation. The RAM temporarily stores the computing results of the CPU.

Specifically, in a case of displacing the orientation of the drive subject 30 in the first direction R11, the controller 70 heats the first actuator member 21 through the first heater 61. Furthermore, in a case of displacing the orientation of the drive subject 30 in the second direction R12, the controller 70 heats the second actuator member 22 through the second heater 62.

The actuator device 10 of the present embodiment discussed above can provide the following actions and advantages (1) to (5).

(1) The first heater 61 and the second heater 62 can control the reciprocating movement of the drive subject 30 in the first direction R11 and the second direction R12, so that the reciprocating movement of the drive subject 30 can be stabilized.

(2) The actuator device 10 includes: the first actuator member 21, which is rotationally displaced in the first direction R11 upon heating of the first actuator member 21 by the first heater 61; and the second actuator member 22, which is rotationally displaced in the second direction R12 upon heating of the second actuator member 22 by the second heater 62. The drive subject 30 is coupled to the first actuator member 21 and the second actuator member 22. In this way, the reciprocating movement of the drive subject 30 in the first direction R11 and the second direction R12 can be easily implemented.

(3) The first actuator member 21 and the second actuator member 22 are arranged in series while the drive subject 30 is interposed between the first actuator member 21 and the second actuator member 22. With this configuration, the amount of rotational displacement of the first actuator member 21 and the amount of rotational displacement of the second actuator member 22 can be canceled with each other at the drive subject 30 even in a case where the first actuator member 21 is rotationally displaced in the first direction R11 by a predetermined angle while the second actuator member 22 is rotationally displaced in the second direction R12 by the predetermined angle in response to an increase in the surrounding temperature around the respective actuator members 21, 22. Therefore, the initial position of the drive subject 30 can be easily maintained.

(4) The actuator device 10 includes: the first heater 61, which serves as the drive device for displacing the drive subject 30 in the deforming direction of the first actuator member 21; and the second heater 62, which serves as the drive device for displacing the drive subject 30 in the deforming direction of the second actuator member 22. In the view taken from the second actuator member 22, the first heater 61 also functions as the drive device that displaces the drive subject 30 in the opposite direction, which is opposite from the deforming direction of the second actuator member 22. Furthermore, in the view taken from the first actuator member 21, the second heater 62 also functions as the drive device that displaces the drive subject 30 in the opposite direction, which is opposite from the deforming direction of the first actuator member 21. In this way, the drive subject 30 can be easily rotationally displaced in the first direction R11 and the second direction R12.

(5) The first actuator member 21 and the second actuator member 22 are made of the polymer fibers. Thereby, the drive subject 30 can be easily rotationally displaced only by changing the temperature of the first actuator member 21 and the second actuator member 22.

First Modification

Next, an actuator device 10 of a first modification of the first embodiment will be described. Hereinafter, differences with respect to the actuator device 10 of the first embodiment will be mainly described.

Figure 3:
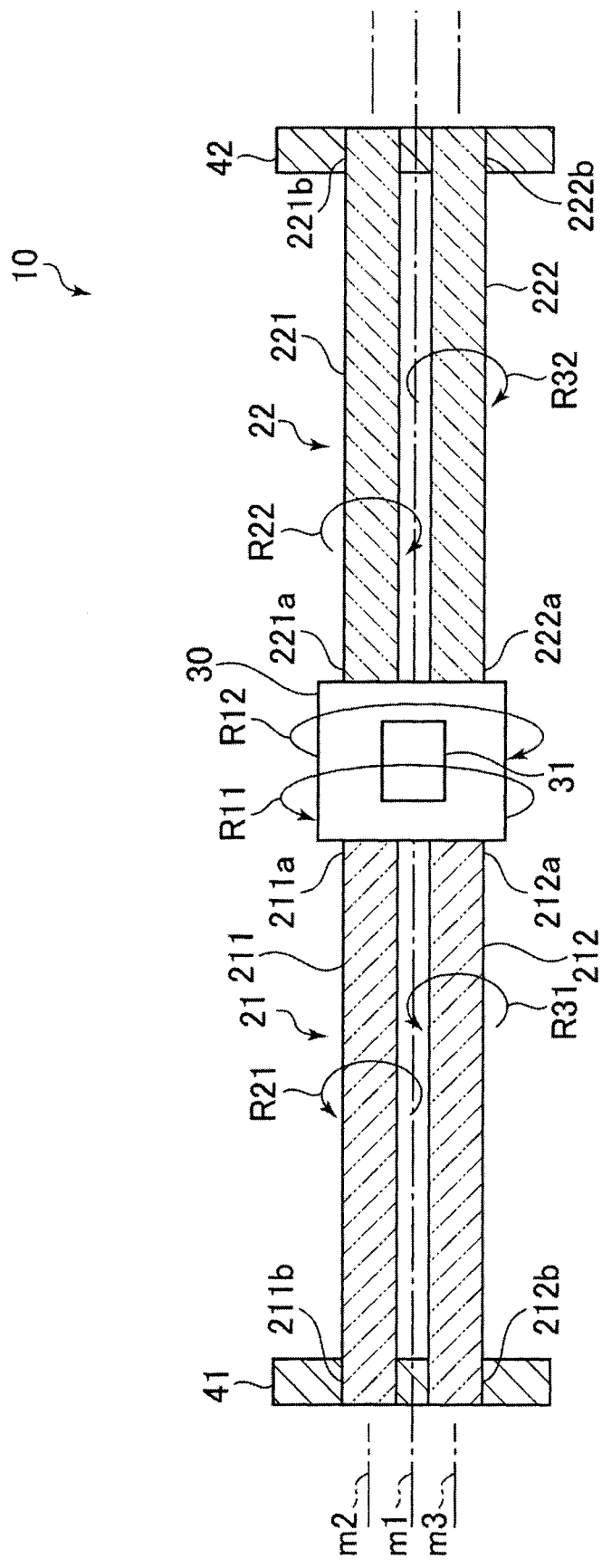
FIG. 3 is a diagram schematically showing a structure of an actuator device of a first modification of the first embodiment.

As shown in FIG. 3, the first actuator member 21 of the present modification includes two actuator elements 211, 212 that are parallel with the axis m1. The actuator element 211 is placed along an axis m2. The axis m2 is parallel with the axis m1. This actuator element 211 is torsionally deformed in the rotational direction R21 about the axis m2 upon heating of the actuator element 211 by the first heater 61. The other actuator element 212 is placed along an axis m3. The axis m3 is parallel with the axis m1 and is located on an opposite side of the axis m1, which is opposite from the axis m2. This actuator element 212 is torsionally deformed in the rotational direction R31 about the axis m3 upon heating of the actuator element 212 by the first heater 61.

The second actuator member 22 includes two actuator elements 221, 222 that are parallel with the axis m1. The actuator element 221 is placed along the axis m2. This actuator element 221 is torsionally deformed in the rotational direction R22, which is opposite from the rotational direction R21, upon heating of the actuator element 221 by the second heater 62. The other actuator element 222 is torsionally deformed in the rotational direction R32, which is opposite from the rotational direction R31, upon heating of the actuator element 222 by the second heater 62.

The drive subject 30 is coupled to one end part 211a, 212a of each of the actuator elements 211, 212. The other end part 211b, 212b of each of the actuator elements 211, 212 is fixed to the first holder 41. The first holder 41 holds the actuator elements 211, 212.

The drive subject 30 is coupled to one end part 221a, 222a of each of the actuator elements 221, 222. The other end part 221b, 222b of each of the actuator elements 221, 222 is fixed to the second holder 42. The second holder 41 holds the actuator elements 221, 222. The first holder 41 and the second holder 41 also have a function of holding the drive subject 30 through the actuator elements 211, 212, 221, 222.

The drive subject 30 is rotationally displaced in the first direction R11 about the axis m1 based on at least one of the deformation of the actuator element 211 in the rotational direction R21 and the deformation of the actuator element 212 in the rotational direction R31. Furthermore, the drive subject 30 is rotationally displaced in the second direction R12 about the axis m1 based on at least one of the deformation of the actuator element 221 in the rotational direction R22 and the deformation of the actuator element 222 in the rotational direction R32.

In the actuator device 10 of the present modification, the first actuator member 21 includes the two actuator elements 211, 212, so that a rotational force, which can be applied to the drive subject 30 in the first direction R11, can be increased in comparison to a case where the first actuator member 21 includes only one actuator element. Furthermore, the second actuator member 22 includes the two actuator elements 221, 222, so that a rotational force, which can be applied to the drive subject 30 in the second direction R12, can be also increased like the first actuator member 21. Therefore, the drive subject 30 can be easily rotationally displaced.

Furthermore, when the first heater 61 selectively heats one or both of the actuator elements 211, 212, it is possible to improve a degree of freedom with respect to adjustment of the amount of rotational displacement and the rotational speed of the drive subject 30 in the first direction R11 in comparison to a case where the first actuator member 21 includes only one actuator element. Similarly, it is possible to improve a degree of freedom with respect to adjustment of the amount of rotational displacement and the rotational speed of the drive subject 30 in the second direction R12.

Second Modification

Next, an actuator device 10 of a second modification of the first embodiment will be described. Hereinafter, differences with respect to the actuator device 10 of the first embodiment will be mainly described.

Figure 4:
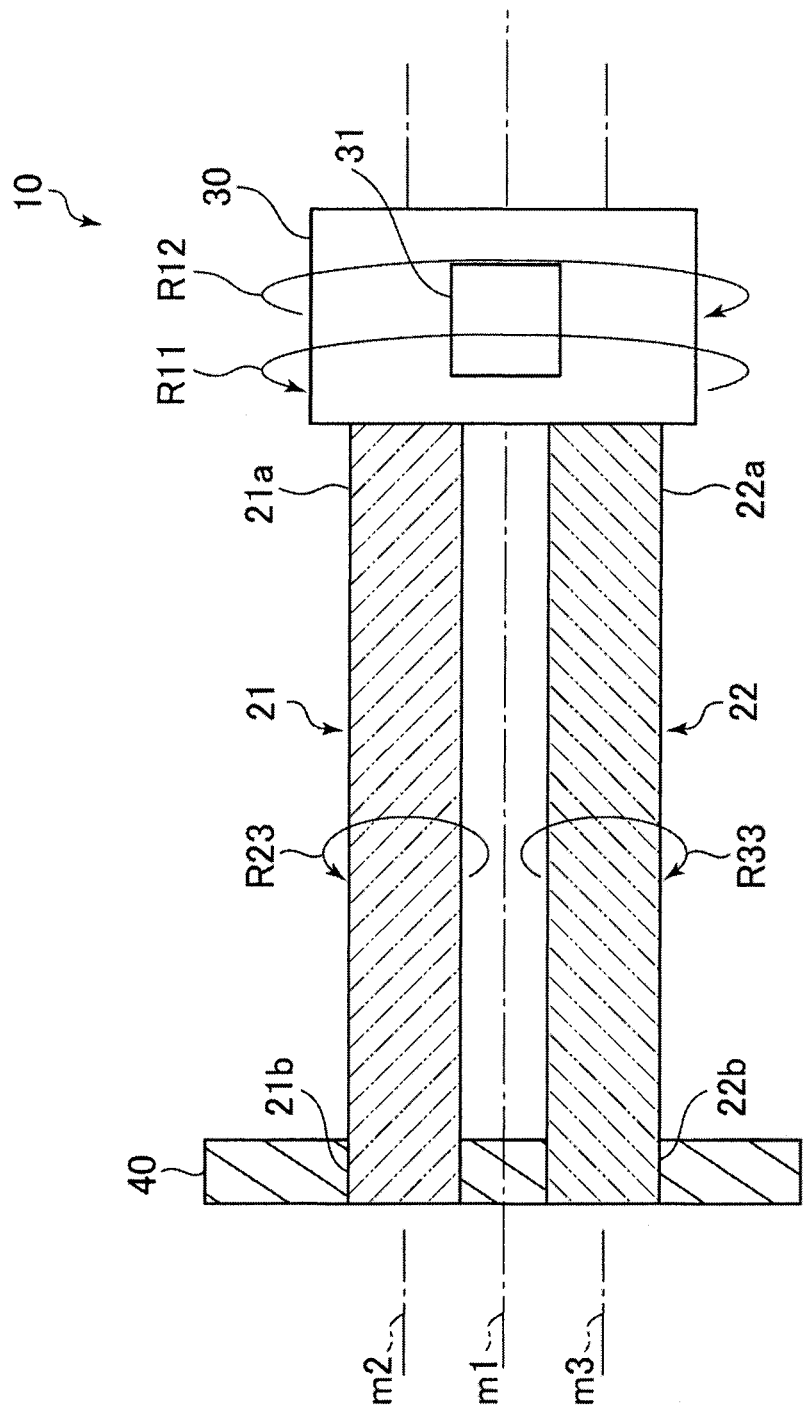
FIG. 4 is a diagram schematically showing a structure of an actuator device of a second modification of the first embodiment.

As shown in FIG. 4, in the actuator device 10 of the present modification, the first actuator member 21 and the second actuator member 22 are arranged parallel to each other while the axis m1 is interposed between the first actuator member 21 and the second actuator member 22. One end part 21a, 22a of each of the first actuator member 21 and the second actuator member 22 is coupled to the drive subject 30. The other end part 21b, 22b of each of the first actuator member 21 and the second actuator member 22 is fixed to the holder 40. The holder 40 holds the first actuator member 21, the second actuator member 22 and the drive subject 30.

The drive subject 30 is rotationally displaced in the first direction R11 according to the torsional displacement of the first actuator member 21 in the first direction R11. Furthermore, the drive subject 30 is rotationally displaced in the second direction R12 according to the torsional displacement of the second actuator member 22 in the second direction R12.

In the actuator device 10 of the present modification, a length of the actuator device 10, which is measured in the axial direction of the axis m1, can be reduced. Specifically, since a size of the actuator device 10 can be reduced, installability of the actuator device 10 can be improved.

Second Embodiment

Next, an actuator device 10 of a second embodiment will be described. Hereinafter, differences with respect to the actuator device 10 of the first embodiment will be mainly described.

Figure 5:
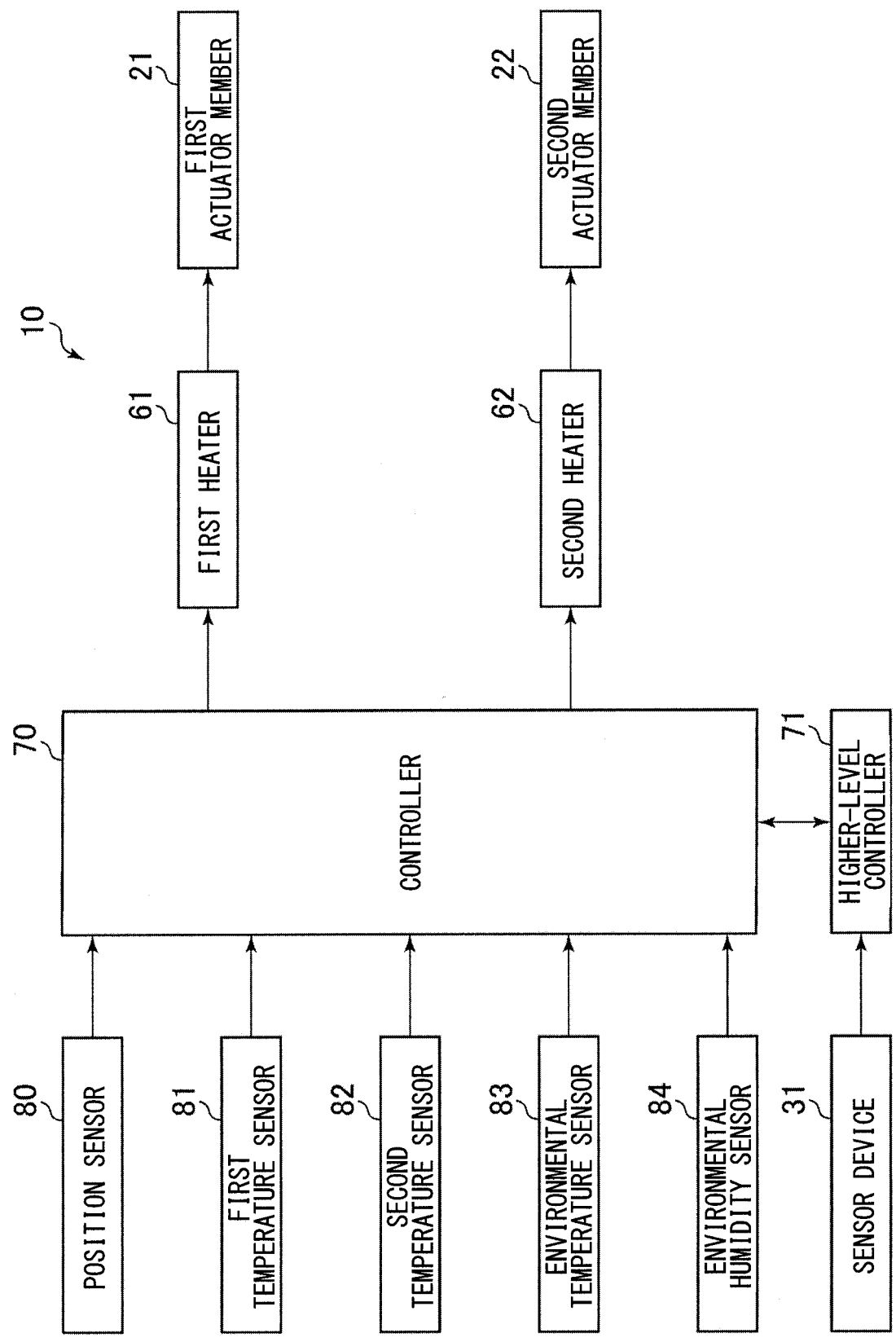
FIG. 5 is a block diagram showing an electrical structure of an actuator device according to a second embodiment.

As shown in FIG. 5, an actuator device 10 of the present embodiment includes a position sensor 80, a first temperature sensor 81, a second temperature sensor 82, an environmental temperature sensor 83 and an environmental humidity sensor 84.

The position sensor 80 senses a current position θ of the drive subject 30 about the axis m1 and outputs a measurement signal, which corresponds to the sensed position θ of the drive subject 30, to the controller 70. The position θ of the drive subject 30 of the present embodiment is indicated by a rotational angle of the drive subject 30 in the following manner. Specifically, a position of the drive subject 30 in a state, in which the first actuator member 21 and the second actuator member 22 are not heated, is defined as an initial position. A rotational angle of the drive subject 30 from the initial position in the first direction R11 is indicated by a positive rotational angle, and a rotational angle of the drive subject 30 in the second direction R12 is indicated by a negative rotational angle. In the present embodiment, the position sensor 80 serves as a position sensor device.

The first temperature sensor 81 senses a current temperature Ta10 of the first actuator member 21 and outputs a measurement signal, which corresponds to the sensed temperature Ta10 of the first actuator member 21, to the controller 70. In the present embodiment, the first temperature sensor 81 serves as a first temperature sensor device.

The second temperature sensor 82 senses a current temperature Ta20 of the second actuator member 22 and outputs a measurement signal, which corresponds to the sensed temperature Ta20 of the second actuator member 22, to the controller 70. In the present embodiment, the second temperature sensor 82 serves as a second temperature sensor device.

The environmental temperature sensor 83 senses an environmental temperature Te, which is a temperature around the first actuator member 21 and the second actuator member 22, and the environmental temperature sensor 83 outputs a measurement signal, which corresponds to the sensed environmental temperature Te, to the controller 70. In the present embodiment, the environmental temperature sensor 83 serves as an environmental temperature sensor device.

The environmental humidity sensor 84 senses an environmental humidity He, which is a humidity around the first actuator member 21 and the second actuator member 22, and the environmental humidity sensor 84 outputs a measurement signal, which corresponds to the sensed environmental humidity He, to the controller 70. In the present embodiment, the environmental humidity sensor 84 serves as an environmental humidity sensor device.

The controller 70 is connected to a higher-level controller (host controller) 71 in a manner that enables communications between the controller 70 and the higher-level controller 71. The higher-level controller 71 executes a predetermined control operation based on an output signal that is outputted from the sensor device 31 installed to the drive subject 30. The controller 70 executes an orientation control operation of the sensor device 31 for controlling the orientation of the sensor device 31 in the first direction R11 and the second direction R12 to execute the predetermined control operation. In the orientation control operation, the controller 70 sets a target position of the sensor device 31 in the first direction R11 and the second direction R12, i.e., a target position θ* of the drive subject 30 and outputs the target position θ* to the controller 70.

The controller 70 obtains the position θ of the drive subject 30, the temperature Ta10 of the first actuator member 21, the temperature Ta20 of the second actuator member 22, the environmental temperature Te and the environmental humidity He based on the measurement signals outputted from the respective sensors 80-84. The controller 70 controls the first heater 61 and the second heater 62 based on the various types of information sensed with the respective sensors 80-84 and the target position θ* transmitted from the higher-level controller 71 and thereby executes a rotational control operation for adjusting the actual position θ of the drive subject 30 to the target position θ*.

Next, a specific procedure of the rotational control operation, which is executed by the controller 70, will be described with reference to FIG. 6. The controller 70 repeats the process shown in FIG. 6 at a predetermined computing cycle.

Figure 6:
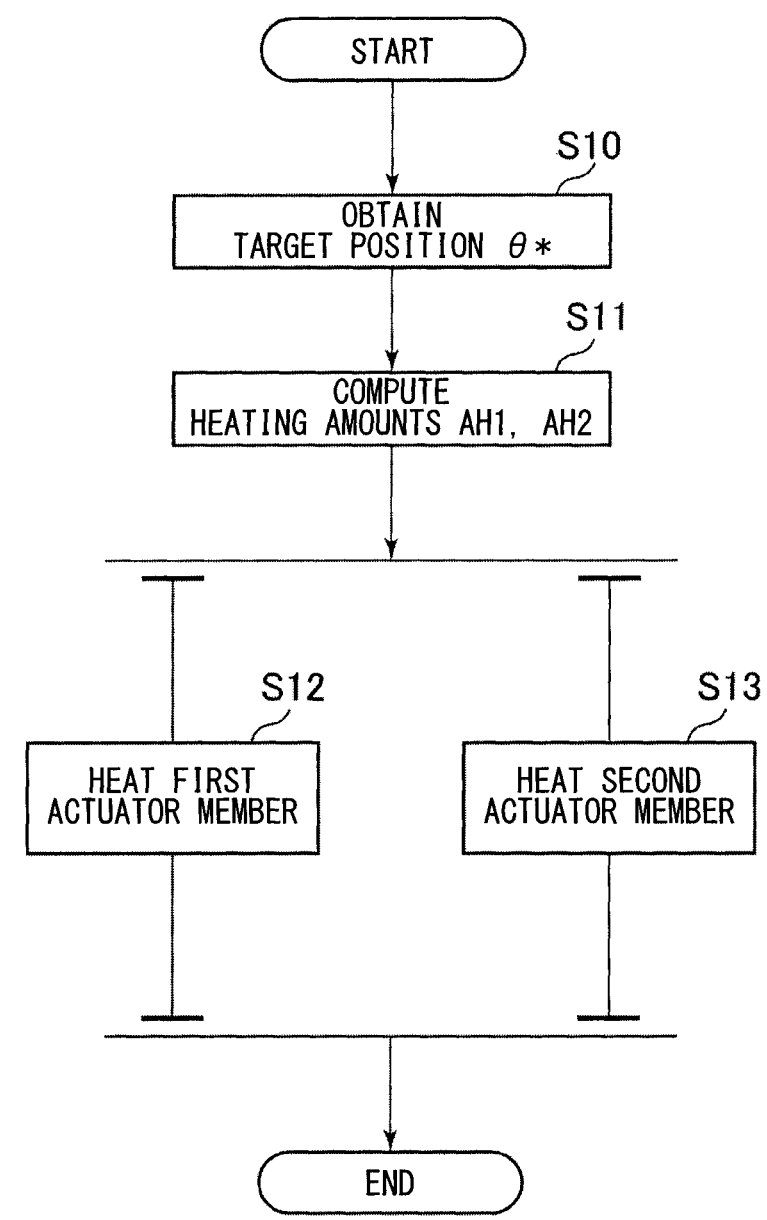
FIG. 6 is a flowchart showing a procedure of a process executed by the actuator device of the second embodiment.

As shown in FIG. 6, first of all, at step S10, the controller 70 obtains the target position θ* from the higher-level controller 71. Next, at step S11, the controller 70 computes the heating amount AH1 of the first actuator member 21 and the heating amount AH2 of the second actuator member 22.

Specifically, the controller 70 computes a difference Δθ between the target position θ* of the drive subject 30 and the current position θ of the drive subject 30. When this positional difference Δθ is a positive value, the controller 70 determines that the drive subject 30 needs to be rotationally displaced in the first direction R11, and thereby the controller 70 obtains the heating amount AH1 of the first actuator member 21 based on the positional difference Δθ through use of, for example, a map(s) and/or a mathematical equation(s). Furthermore, when this positional difference Δθ is a negative value, the controller 70 determines that the drive subject 30 needs to be rotationally displaced in the second direction R12, and thereby the controller 70 obtains the heating amount AH2 of the second actuator member 22 based on the positional difference Δθ.

The characteristic of the torsional deformation of each actuator member 21, 22 changes depending on the environmental temperature Te and the environmental humidity He. Therefore, the controller 70 obtains a correction coefficient based on the environmental temperature Te and the environmental humidity He through use of, for example, a map(s) and/or a mathematical equation(s), and the controller 70 multiplies this correction coefficient to the heating amount AH1, AH2 to correct the heating amount AH1, AH2.

After step S11, the controller 70 executes a process of step S12 and a process of step S13 in parallel. Specifically, at step S12, the controller 70 controls the first heater 61 such that the heating amount AH1, which is computed at step S11, is supplied to the first actuator member 21. Furthermore, at step S13, the controller 70 controls the second heater 62 such that the heating amount AH2, which is computed at step S11, is supplied to the second actuator member 22. The controller 70 terminates the series of processes after the execution of steps S12 and S13.

The actuator device 10 of the present embodiment discussed above can provide the following action(s) and advantage(s) indicated at the following section (6).

(6) The controller 70 controls the first heater 61 and the second heater 62 based on the difference Δθ between the target position θ* of the drive subject 30 and the current position θ of the drive subject 30. Thereby, the drive subject 30 can be easily displaced to the target position θ*.

Third Embodiment

Next, an actuator device 10 according to a third embodiment will be described. Hereinafter, differences with respect to the actuator device 10 of the second embodiment will be mainly described.

Figure 7:
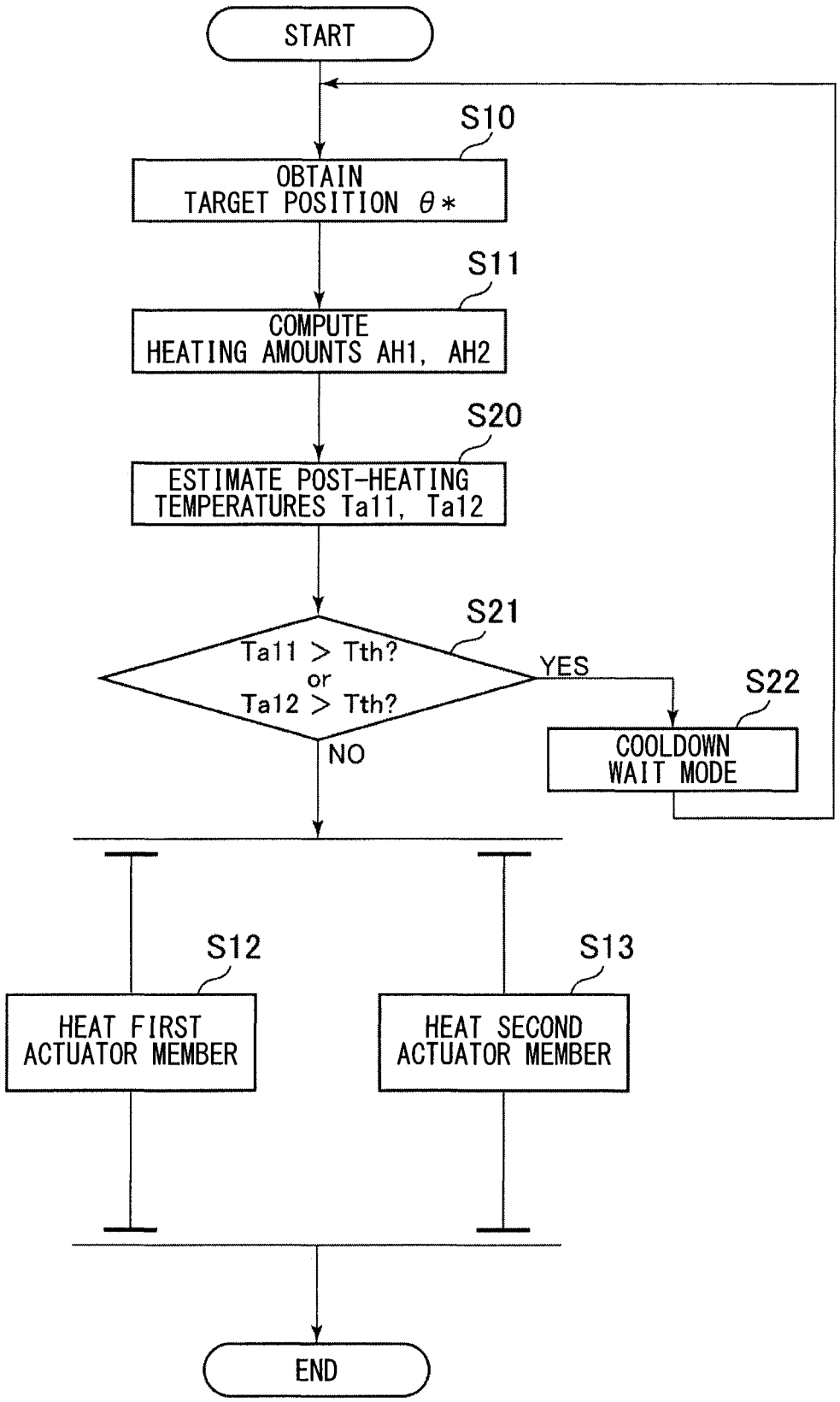
FIG. 7 is a flowchart showing a procedure of a process executed by an actuator device according to a third embodiment.

As shown in FIG. 7, after the execution of step S11, the controller 70 of the present embodiment proceeds to step S20 where the controller 70 estimates a temperature Ta11 of the first actuator member 21 and a temperature Ta21 of the second actuator member 22. Specifically, the controller 70 estimates a first post-heating temperature Ta11, which is a temperature of the first actuator member 21 after the heating of the first actuator member 21 by the first heater 61, based on the current temperature Ta10 of the first actuator member 21 and the heating amount AH1 computed at step S11. Furthermore, the controller 70 estimates a second post-heating temperature Ta21, which is a temperature of the second actuator member 22 after the heating of the second actuator member 22 by the second heater 62, based on the current temperature Ta20 of the second actuator member 22 and the heating amount AH2 computed at step S11.

After step S20, the controller 70 proceeds to step S21 where the controller 70 determines whether any one of the first post-heating temperature Ta11 or the second post-heating temperature Ta21 is higher than a predetermined temperature threshold Tth. The temperature threshold Tth is preset through, for example, an experiment(s), in a manner that enables determination of whether the first actuator member 21 and the second actuator member 22 have reached the temperature, above which the first actuator member 21 and the second actuator member 22 no longer deform in a normal manner. For example, a glass transition temperature or a melting temperature of the first actuator member 21 and the second actuator member 22 may be used as the temperature threshold Tth.

When YES is returned at step S21, i.e., when one of the first post-heating temperature Ta11 and the second post-heating temperature Ta21 is higher than the predetermined temperature threshold Tth, the controller 70 proceeds to step S22 where the controller 70 shifts to a cooldown wait mode. Specifically, once the operation shifts to the cooldown wait mode, the controller 70 temporarily stops the heating of the first actuator member 21 and the second actuator member 22 and let the first actuator member 21 and the second actuator member 22 to naturally cool until it is predicted that the first post-heating temperature Ta11 and the second post-heating temperature Ta21 become equal to or lower than the temperature threshold Tth. After the first actuator member 21 and the second actuator member 22 are naturally cooled to the point, at which it is predicted that the first post-heating temperature Ta11 and the second post-heating temperature Ta21 become equal to or lower than the temperature threshold Tth, the controller 70 returns to step S10.

In contrast, when NO is returned at step S21, i.e., when the first post-heating temperature Ta11 and the second post-heating temperature Ta21 are equal to or lower than the predetermined temperature threshold Tth, the controller 70 executes the operations at steps S12, S13.

The actuator device 10 of the present embodiment discussed above can provide the following action(s) and advantage(s) indicated at the following section (7).

(7) In the case where it is determined that one of first post-heating temperature Ta11 and the second post-heating temperature Ta21 is higher than the predetermined temperature threshold Tth, the controller 70 temporarily stops the heating of the first actuator member 21 and the heating of the second actuator member 22. In this way, the appropriate rotational displacement of the first actuator member 21 and the second actuator member 22 can be likely ensured, and thereby the positional accuracy of the drive subject 30 can be improved.

Fourth Embodiment

Next, an actuator device 10 according to a fourth embodiment will be described. Hereinafter, differences with respect to the actuator device 10 of the second embodiment will be mainly described.

Figure 8:
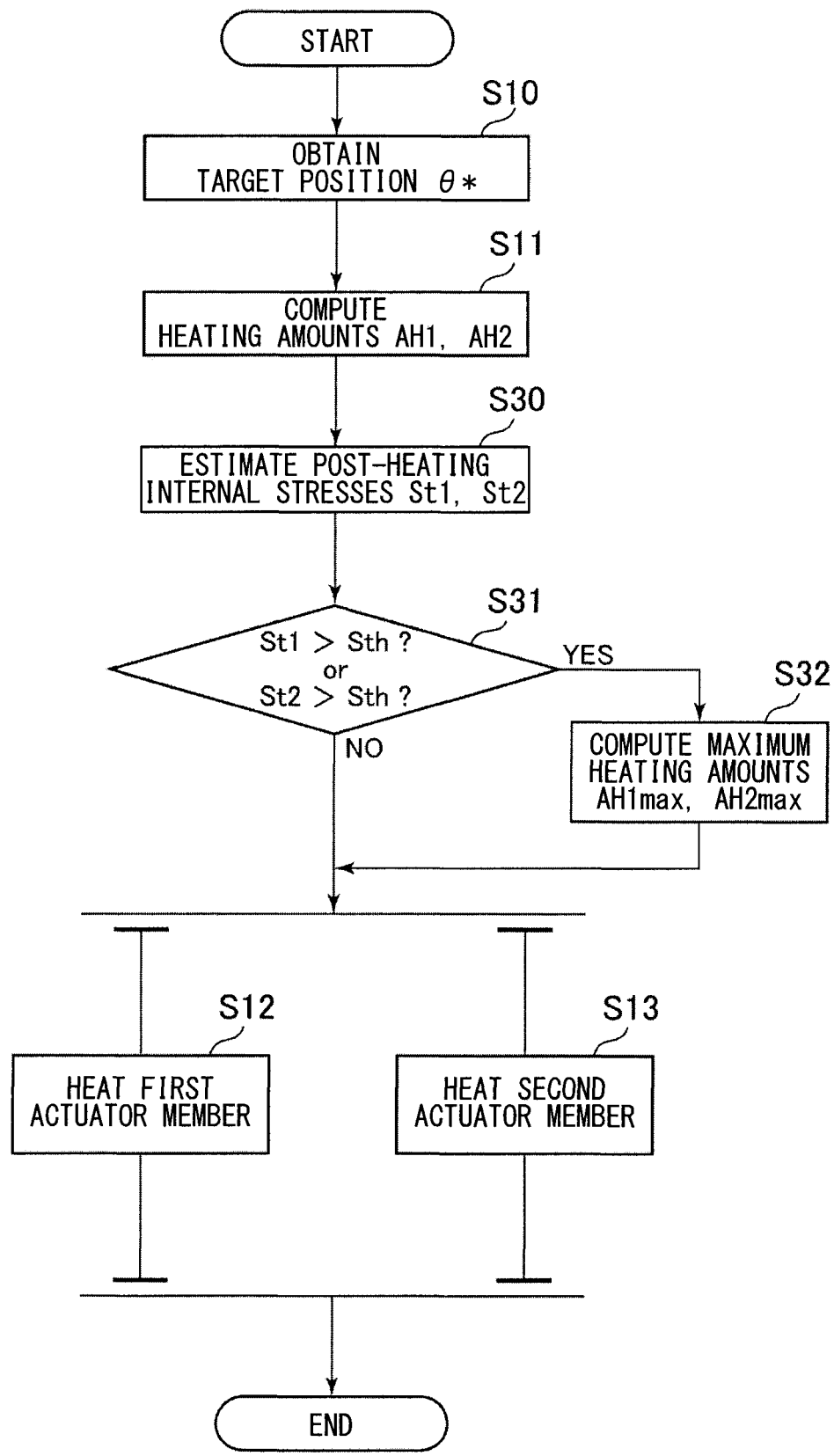
FIG. 8 is a flowchart showing a procedure of a process executed by an actuator device according to a fourth embodiment.

As shown in FIG. 8, after the execution of step S11, the controller 70 of the present embodiment proceeds to step S30 where the controller 70 estimates an internal stress St1 of the first actuator member 21 and an internal stress St2 of the second actuator member 22. Specifically, the controller 70 estimates the first internal stress St1, which is an internal stress of the first actuator member 21 after the heating of the first actuator member 21 by the first heater 61, based on the current temperature Ta10 of the first actuator member 21, the current position θ of the drive subject 30 and the heating amount AH1 computed at step S11 through use of, for example, a map(s) and/or a mathematical equation(s). Specifically, the controller 70 estimates the second internal stress St2, which is an internal stress of the second actuator member 22 after the heating of the second actuator member 22 by the second heater 62, based on the current temperature Ta20 of the second actuator member 22, the current position θ of the drive subject 30 and the heating amount AH2 computed at step S11 through use of, for example, a map(s) and/or a mathematical equation(s).

After step S30, the controller 70 proceeds to step S31 where the controller 70 determines whether one of the first internal stress St1 and the second internal stress St2 is larger than a predetermined stress threshold Sth. The stress threshold Sth is preset through, for example, an experiment(s), in a manner that enables determination of whether a stress, which substantially deteriorates the durability of each actuator member 21, 22, is generated. For example, a stress, which corresponds to a breaking strength of each actuator member 21, 22, may be used as the stress threshold Sth.

When YES is returned at step S31, i.e., when one of the first internal stress St1 and the second internal stress St2 is larger than the predetermined stress threshold Sth, the controller 70 proceeds to step S32. At step S32, the controller 70 obtains a maximum heating amount AH1max, AH2max, which can be supplied to each actuator member 21, 22 at the stress threshold Sth or less, through use of, for example, a map(s) and/or a mathematical equation(s). After step S32, the controller 70 executes a process of step S12 and a process of step S13 in parallel. Specifically, at step S12, the controller 70 controls the first heater 61 such that the maximum heating amount AH1max, which is computed at step S32, is supplied to the first actuator member 21. Furthermore, at step S13, the controller 70 controls the second heater 62 such that the maximum heating amount AH2max, which is computed at step S32, is supplied to the second actuator member 22. The controller 70 terminates the series of processes after execution of steps S12 and S13.

In contrast, when NO is returned at step S31, i.e., when the first internal stress St1 and the second internal stress St2 are equal to or lower than the predetermined stress threshold Sth, the controller 70 executes the operations at steps S12, S13 in parallel. At step S12, the controller 70 controls the first heater 61 such that the heating amount AH1, which is computed at step S11, is supplied to the first actuator member 21. Furthermore, at step S13, the controller 70 controls the second heater 62 such that the heating amount AH2, which is computed at step S11, is supplied to the second actuator member 22. The controller 70 terminates the series of processes after execution of steps S12 and S13.

The actuator device 10 of the present embodiment discussed above can provide the following action(s) and advantage(s) indicated at the following section (8).

(8) When it is determined that the first internal stress St1 is larger than the stress threshold Sth, the controller 70 controls the first heater 61 through use of the maximum heating amount AH1max, which can be supplied to the first actuator member 21 at the stress threshold Sth or less, so that the heating amount, which is supplied to the first actuator member 21, is limited. Furthermore, when it is determined that the second internal stress St2 is larger than the stress threshold Sth, the controller 70 controls the second heater 62 through use of the maximum heating amount AH2max, which can be supplied to the second actuator member 22 at the stress threshold Sth or less, so that the heating amount, which is supplied to the second actuator member 22, is limited. In this way, the generation of the excess stress at the first actuator member 21 and the second actuator member 22 through the heating of the first heater 61 and the second heater 62 can be limited, so that a damage of the first actuator member 21 and a damage of the second actuator member 22 can be easily avoided.

Fifth Embodiment

Next, an actuator device 10 according to a fifth embodiment will be described. Hereinafter, differences with respect to the actuator device 10 of the first embodiment will be mainly described.

Figure 9:
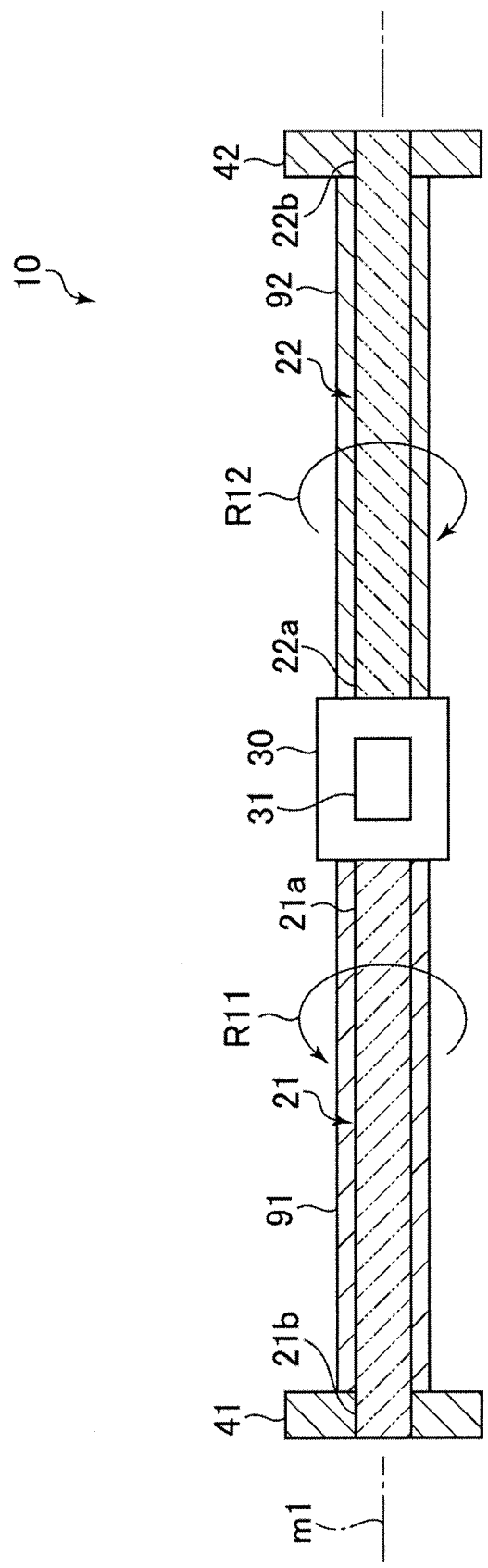
FIG. 9 is a diagram schematically showing a structure of an actuator device according to a fifth embodiment.

As shown in FIG. 9, the actuator device 10 of the present embodiment further includes a first Peltier device 91 and a second Peltier device 92.

The first Peltier device 91 functions as a first cooler device and a second drive device that displace the drive subject 30 in an opposite direction, which is opposite from the deforming direction of the first actuator member 21, by cooling the first actuator member 21 in response to energization of the first Peltier device 91. The first Peltier device 91 is shaped into a cylindrical tubular form that is centered at the axis m1. The first Peltier device 91 is placed to surround an outer periphery of the first actuator member 21. An inner peripheral surface of the first Peltier device 91 and an outer peripheral surface of the first actuator member 21 are in contact with each other with low friction. In this way, the first actuator member 21 can be effectively cooled by the first Peltier device 91 without interfering the rotational displacement of the first actuator member 21. Here, a gap may be formed between the inner peripheral surface of the first Peltier device 91 and the outer peripheral surface of the first actuator member 21 to place the first Peltier device 91 in a non-contact state where the first Peltier device 91 does not contact the first actuator member 21.

The second Peltier device 92 functions as a second cooler device and a second drive device that displace the drive subject 30 in an opposite direction, which is opposite from the deforming direction of the second actuator member 22, by cooling the second actuator member 22 in response to energization of the second Peltier device 92. The second Peltier device 92 is shaped into a cylindrical tubular form that is centered at the axis m1. The second Peltier device 92 is placed to surround an outer periphery of the second actuator member 22. An inner peripheral surface of the second Peltier device 92 and an outer peripheral surface of the second actuator member 22 are in contact with each other with low friction. Here, a gap may be formed between the inner peripheral surface of the second Peltier device 92 and the outer peripheral surface of the second actuator member 22 to place the second Peltier device 92 in a non-contact state where the second Peltier device 92 does not contact the second actuator member 22.

Figure 10:
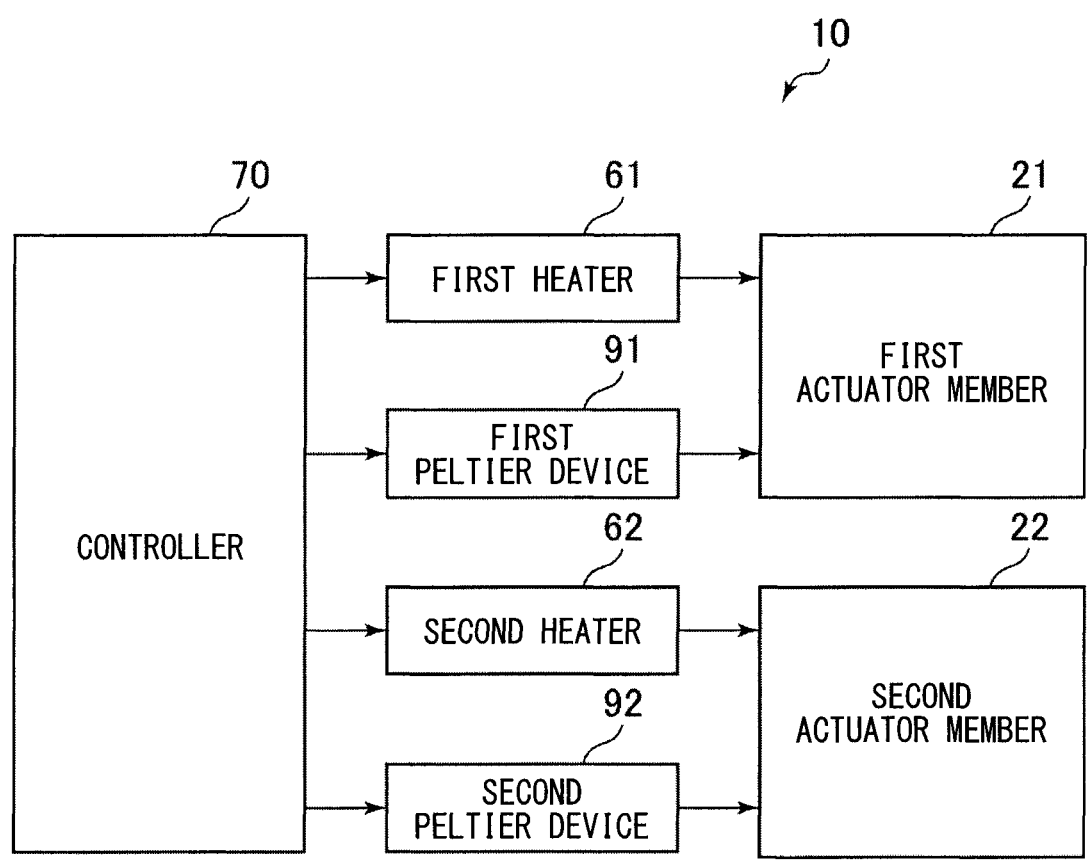
FIG. 10 is a block diagram showing an electrical structure of the actuator device according to the fifth embodiment.

As shown in FIG. 10, the controller 70 controls the energization of the first Peltier device 91 and the energization of the second Peltier device 92 to further cool the first actuator member 21 and the second actuator member 22. Specifically, at the time of rotationally displacing the drive subject 30 in the first direction R11, the controller 70 heats the first actuator member 21 through the first heater 61 and cools the second actuator member 22 through the second Peltier device 92. Furthermore, at the time of rotationally displacing the drive subject 30 in the second direction R12, the controller 70 heats the second actuator member 22 through the second heater 62 and cools the first actuator member 21 through the first Peltier device 91.

The actuator device 10 of the present embodiment discussed above can provide the following action(s) and advantage(s) indicated at the following section (9).

(9) The torsional deformation of the first actuator member 21 in the second direction R12 is promoted by cooling the first actuator member 21 through the first Peltier device 91, so that the rotational displacement of the drive subject 30 in the second direction R12 is promoted. Furthermore, the torsional deformation of the second actuator member 22 in the first direction R11 is promoted by cooling the second actuator member 22 through the second Peltier device 92, so that the rotational displacement of the drive subject 30 in the first direction R11 is promoted. As a result, the rotational displacement of the drive subject 30 is promoted.

Modification

Next, an actuator device 10 of a modification of the fifth embodiment will be described. Hereinafter, differences with respect to the actuator device 10 of the fifth embodiment will be mainly described.

Figure 11:
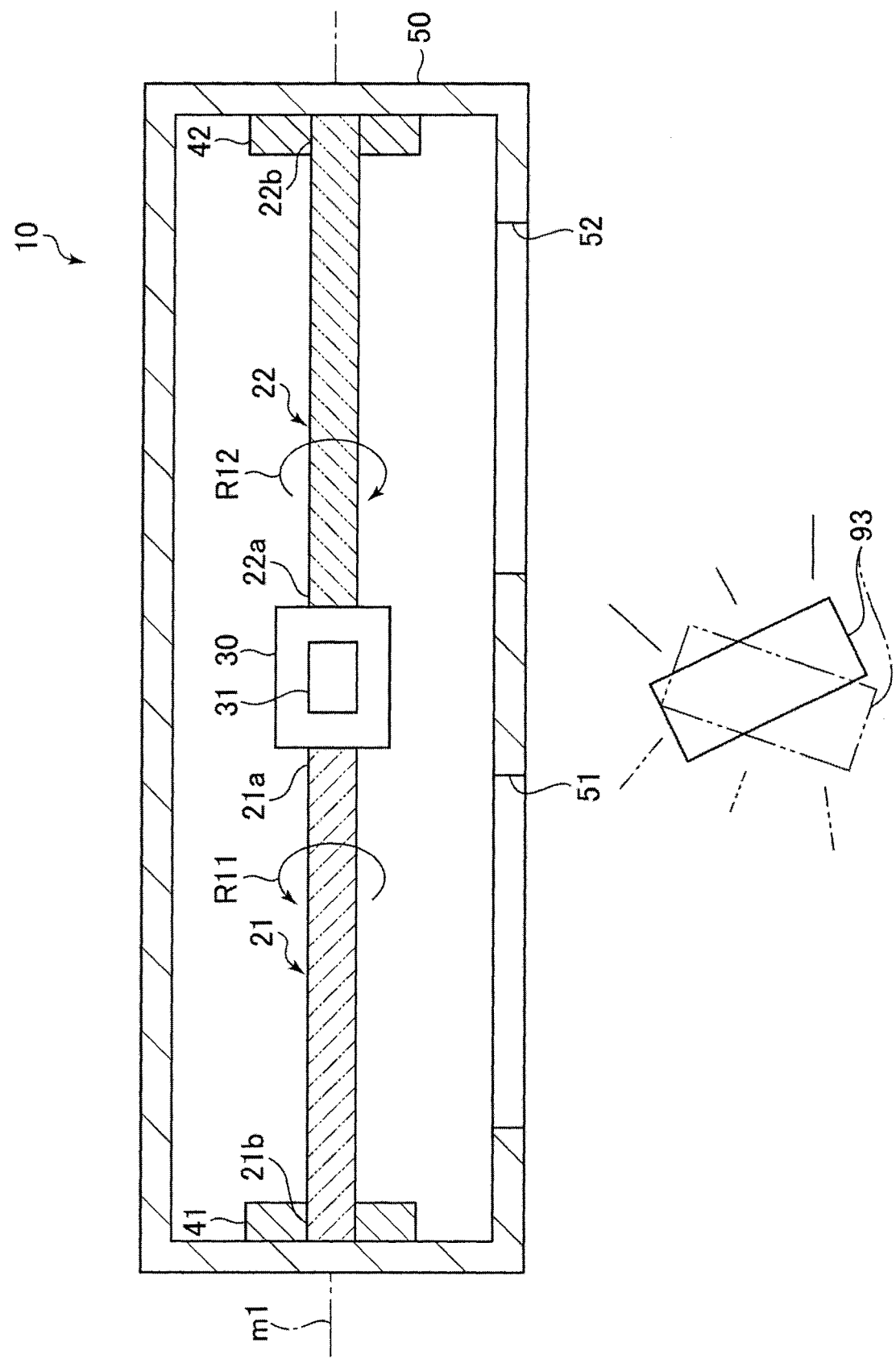
FIG. 11 is a diagram schematically showing a structure of an actuator device of a modification of the fifth embodiment.

As shown in FIG. 11, the actuator device 10 of the present modification includes a housing 50 and a blower 93.

The housing 50 is shaped into a box form. The housing 50 receives the first actuator member 21, the second actuator member 22 and the drive subject 30. The first holder 41 and the second holder 42 are fixed to the housing 50.

The blower 93 functions as a cooler device in place of the first Peltier device 91 and the second Peltier device 92 of the fifth embodiment. The blower 93 includes a mechanism that is configured to change a direction of an air flow blown from the blower 93. The blower 93 is placed at an outside of the housing 50. The blower 93 selectively supplies the forced air flow to one of the first actuator member 21 and the second actuator member 22 through a corresponding one of openings 51, 52 formed at the housing 50 by changing the flow direction of the air blown from the blower 93. The blower 93 may be a dedicated blower that is dedicated to the actuator device 10 or a blower used in another peripheral device. The blower, which is used in the other peripheral device, may be a blower used at, for example, an air conditioning apparatus of a vehicle.

Figure 12:
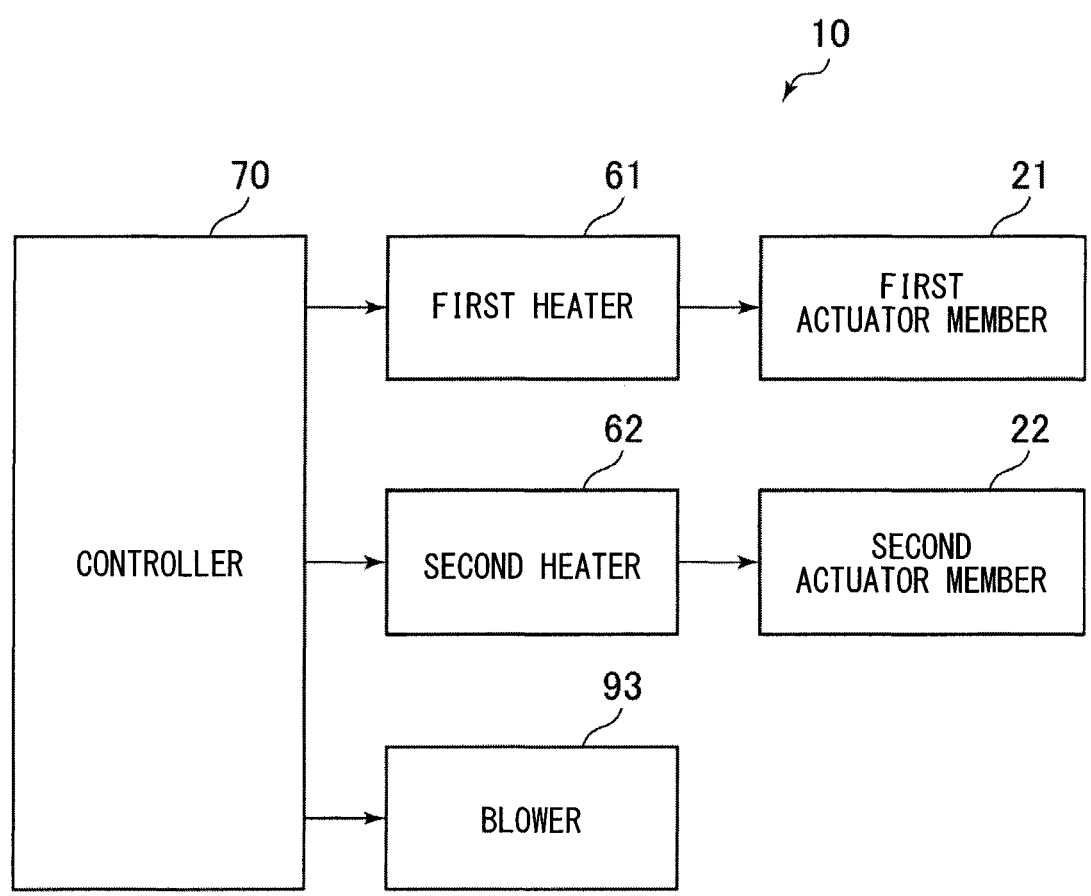
FIG. 12 is a block diagram showing an electrical structure of the actuator device according to the fifth embodiment.

As shown in FIG. 12, the controller 70 controls the blower 93 to further cool the first actuator member 21 and the second actuator member 22. Specifically, at the time of rotationally displacing the drive subject 30 in the first direction R11, the controller 70 heats the first actuator member 21 through the first heater 61 and cools the second actuator member 22 through the blower 93. Furthermore, at the time of rotationally displacing the drive subject 30 in the second direction R12, the controller 70 heats the second actuator member 22 through the second heater 62 and cools the first actuator member 21 through the blower 93.

Even with the above construction, the action(s) and advantage(s) indicated at the above section (9) can be achieved.

Sixth Embodiment

Next, an actuator device 10 according to a sixth embodiment will be described. Hereinafter, differences with respect to the actuator device 10 of the first embodiment will be mainly described.

Figure 13:
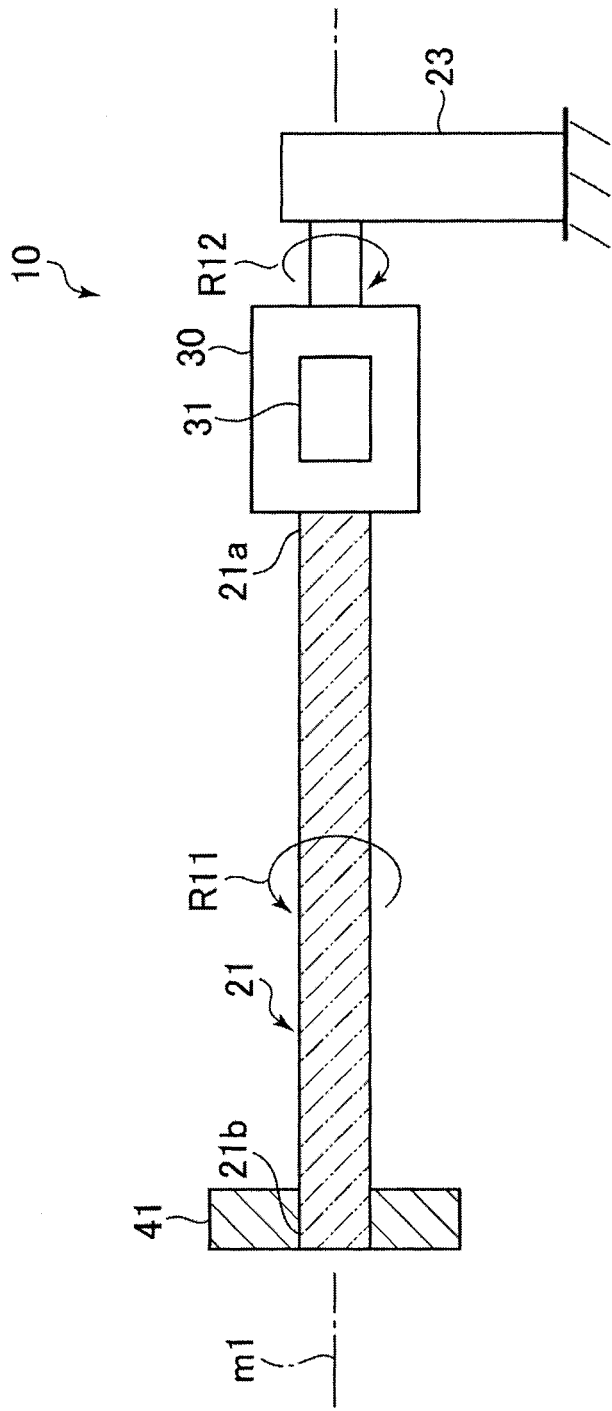
FIG. 13 is a diagram schematically showing a structure of an actuator device according to a sixth embodiment.

As shown in FIG. 13, the actuator device 10 of the present embodiment includes a spiral torsion spring 23 in place of the second actuator member 22. The spiral torsion spring 23 is coupled to the drive subject 30. The spiral torsion spring 23 accumulates a resilient energy upon winding of metal of the spiral torsion spring 23, which is in a plate form, when the drive subject 30 is rotationally displaced in the first direction R11 in response to the torsional deformation of the actuator member 21. The spiral torsion spring 23 applies the resilient force, which corresponds to the accumulated resilient energy, to the drive subject 30 in the second direction R12. Thus, when the force, which is applied from the spiral torsion spring 23 to the drive subject 30 in the second direction R12, becomes larger than the force, which is applied from the actuator member 21 to the drive subject 30 in the first direction R11, the drive subject 30 is displaced in the second direction R12 by using the resilient force of the spiral torsion spring 23 as a restoring force. In the present embodiment, the spiral torsion spring 23 serves as a resilient force applicator.

The actuator device 10 of the present embodiment discussed above can provide the following action(s) and advantage(s) indicated at the following section (10).

(10) The drive subject 30 is displaced in the second direction R12 by the resilient force of the spiral torsion spring 23. In this way, the force in the second direction R12 can be more reliably applied to the drive subject 30, and thereby returning of the drive subject 30 to the initial position is promoted.

Seventh Embodiment

Next, an actuator device 10 according to a seventh embodiment will be described. Hereinafter, differences with respect to the actuator device 10 of the first embodiment will be mainly described.

Figure 14:
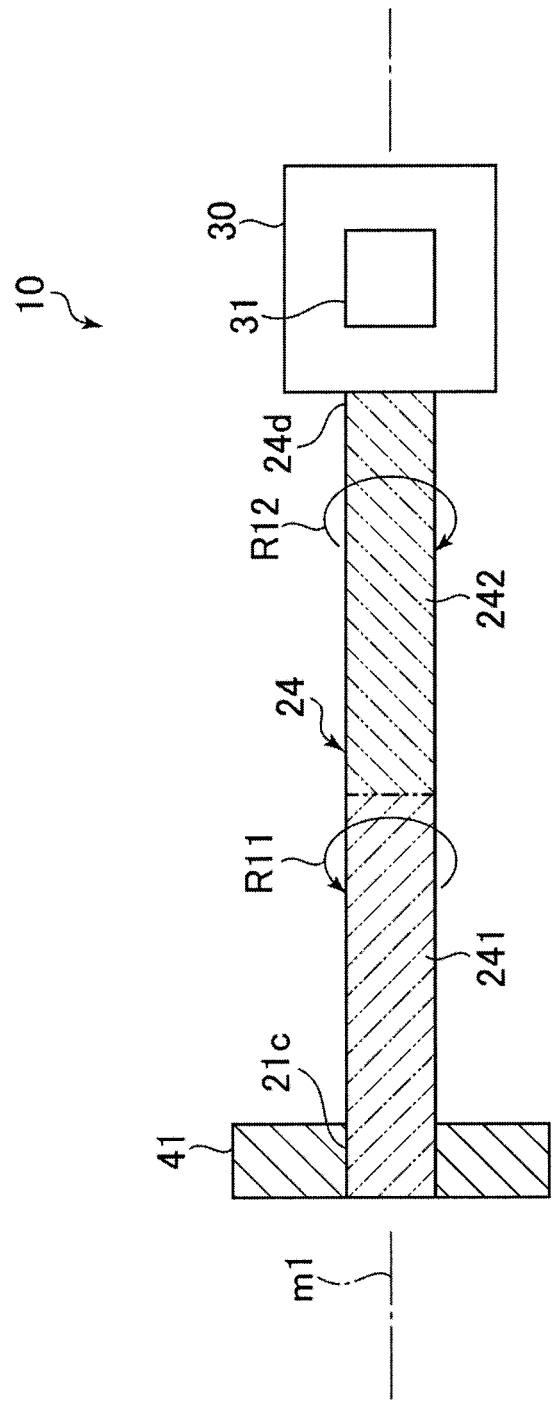
FIG. 14 is a diagram schematically showing a structure of an actuator device according to a seventh embodiment.

As shown in FIG. 14, the actuator device 10 of the present embodiment includes an actuator member 24 in place of the first actuator member 21 and the second actuator member 22. As indicated by a dot-dot-dash line in the drawing, the actuator member 24 includes a first orientation region 241 and a second orientation region 242 while an orientation direction of molecules of the actuator member 24 in the first orientation region 241 differs from an orientation direction of molecules of the actuator member 24 in the second orientation region 242. The first orientation region 241 and the second orientation region 242 are arranged on two opposite sides, respectively, of the actuator member 24 in the longitudinal direction of the actuator member 24 while a center part of the actuator member 24 serves as a boundary between the first orientation region 241 and the second orientation region 242.

In the first orientation region 241, the orientation direction of the polyamide molecules of the actuator member 24 is a spiral direction that is spiral about the axis m1 while the spiral direction is tilted in one direction that is angled relative to the axis m1 by a predetermined angle. In the second orientation region 242, the orientation direction of the polyamide molecules of the actuator member 24 is a spiral direction that is spiral about the axis m1 while the spiral direction is tilted in an opposite direction, which is opposite from the orientation direction of the first orientation region 241, relative to the axis m1 by a predetermined angle. In this way, the first orientation region 241 has a characteristic of that the first orientation region 241 is torsionally deformed in the first direction R11 upon heating of the first orientation region 241 and is torsionally deformed in the second direction R12 upon cooling of the first orientation region 241 through, for example, natural cooling. Furthermore, the second orientation region 242 has a characteristic of that the second orientation region 242 is torsionally deformed in the second direction R12 upon heating of the second orientation region 242 and is torsionally deformed in the first direction R11 upon cooling of the second orientation region 242 through, for example, natural cooling.

The first heater 61 shown in FIG. 2 supplies the electric current to the metal plating of the first orientation region 241 of the actuator member 24, so that the first orientation region 241 is heated by Joule heat. In this way, the first orientation region 241 is torsionally deformed in the first direction R11, and thereby the drive subject 30 is rotationally displaced in the first direction R11. As discussed above, in the view taken from the first orientation region 241, the first heater 61 of the present embodiment functions as a first drive device that displaces the drive subject 30 in the deforming direction of the first orientation region 241 by applying the energy to the first orientation region 241 of the actuator member 24. Furthermore, in the view taken from the second orientation region 242, the first heater 61 also functions as a second drive device that displaces the drive subject 30 in the opposite direction, which is opposite from the deforming direction of the second orientation region 242.

The second heater 62 shown in FIG. 2 supplies the electric current to the metal plating of the second orientation region 242 of the actuator member 24, so that the second orientation region 242 is heated by Joule heat. In this way, the second orientation region 242 is torsionally deformed in the second direction R12, and thereby the drive subject 30 is rotationally displaced in the second direction R12. As discussed above, in the view taken from the second orientation region 242, the second heater 62 of the present embodiment functions as a first drive device that displaces the drive subject 30 in the deforming direction of the second orientation region 242 by applying the energy to the second orientation region 242 of the actuator member 24. Furthermore, in the view taken from the first orientation region 241, the second heater 62 also functions as a second drive device that displaces the drive subject 30 in the opposite direction, which is opposite from the deforming direction of the first orientation region 241.

The actuator device 10 of the present embodiment discussed above can provide the following action(s) and advantage(s) indicated at the following section (11).

(11) The actuator device 10 of the present embodiment can reduce the number of actuator members in comparison to the actuator device 10 of the first embodiment, so that the actuator device 10 of the present embodiment can be made compact.

Eighth Embodiment

Next, an actuator device 10 according to an eighth embodiment will be described. Hereinafter, differences with respect to the actuator device 10 of the first embodiment will be mainly described.

Figure 15:
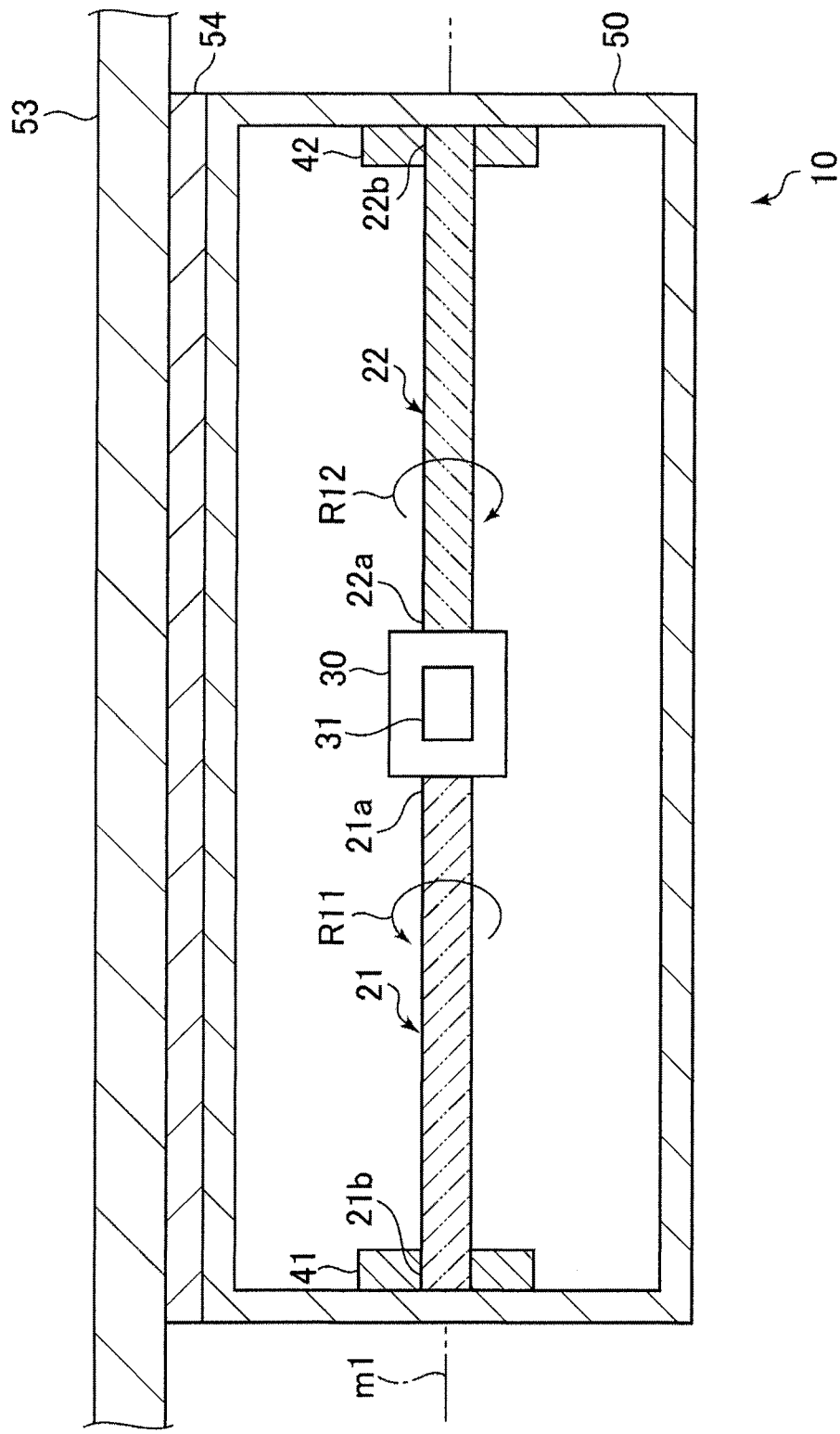
FIG. 15 is a diagram schematically showing a structure of an actuator device according to an eighth embodiment.

As shown in FIG. 15, the actuator device 10 of the present modification includes the housing 50 and a thermal insulator 54.

The housing 50 is shaped into a box form. The housing 50 receives the first actuator member 21, the second actuator member 22 and the drive subject 30. The housing 50 is fixed to a fixation member 53 through the thermal insulator 54.

The actuator device 10 of the present embodiment discussed above can provide the following action(s) and advantage(s) indicated at the following section (12).

(12) As shown in FIG. 15, in the case where the housing 50 is fixed to the fixation member 53, when the heat of the fixation member 53 is transmitted to the housing 50, the first actuator member 21 and the second actuator member 22 are heated. In this case, an unintentional torsional deformation is generated at the first actuator member 21 and the second actuator member 22, so that there is a possibility of that the amount of rotational displacement of the drive subject 30 cannot be appropriately controlled. With respect to this point, in the actuator device 10 of the present embodiment, since the transmission of the heat from the fixation member 53 to the housing 50 is limited by the thermal insulator 54, an unintentional torsional deformation is less likely generated in the first actuator member 21 and the second actuator member 22. Therefore, the amount of rotational displacement of the drive subject 30 can be more accurately controlled.

Other Embodiments

The above respective embodiments may be modified in the following manner. The first actuator member 21 of the first modification of the first embodiment includes the two actuator elements 211, 212. Alternatively, the first actuator member 21 of the first modification of the first embodiment may include three or more actuator elements. Similarly, the second actuator member 22 may include three or more actuator elements.

The polymer fiber material should not be limited to polyamide. The polymer fiber material may be, for example, Kevlar, polyethylene, polypropylene, polyester or a composite material thereof.

In the actuator device 10 of the modification of the fifth embodiment, instead of changing the direction of the air flow of the blower 93, for example, the blower 93 may be moved along the first actuator member 21 and the second actuator member 22 to selectively supply the forced air to one of the first actuator member 21 and the second actuator member 22.

In the actuator device 10 of the modification of the fifth embodiment, a blower, which supplies forced air to the first actuator member 21, and a blower, which supplies forced air to the second actuator member 22, may be individually provided. In such a case, the controller 70 drives one of the two blowers to selectively supply the forced air to one of the first actuator member 21 and the second actuator member 22.

In the actuator device 10 of the sixth embodiment, in place of the spiral torsion spring 23, an appropriate resilient force applicator, which can apply a resilient force to the actuator member 21 to rotationally displace the drive subject 30 in the second direction R12, may be used.

The method of heating each actuator member 21, 22, 24 should not be limited to the method of applying the electric current to the metal plating formed at the surface of the actuator member 21, 22, 24, and another appropriate method may be used to heat each actuator member 21, 22, 24. For example, a coil may be wound around an outer peripheral surface of each actuator member 21, 22, 24, and the actuator member 21, 22, 24 may be heated by applying the electric current to the coil. Alternatively, a heat-generating heater may be used to heat each actuator member 21, 22, 24.

The length of the first actuator member 21 and the length of the second actuator member 22 measured in the longitudinal direction may be different from each other, and the material of the first actuator member 21 and the material of the second actuator member 22 may be different from each other.

The material of each actuator member 21, 22, 24 should not be limited to the polymer fibers. Alternative to the polymer fibers, there may be used another appropriate material, which is deformable in response to an input of energy from an outside by an electrical means, an optical means, a chemical means, a thermal means, an absorbing means or another means. This type of material may be, for example, a shape memory alloy, a dielectric elastomer, a magnetic gel, or an electrically conductive polymer.

Each actuator member 21, 22, 24 should not be limited to the member that is torsionally deformed in response to the application of the energy to the actuator member 21, 22, 24. Alternatively, a member, which is linearly displaced in the longitudinal direction in response to application of energy to the member, may be used. For example, an actuator member, which is expandable in a direction parallel to the axis m1 in response to heating and is contractible in the direction parallel to the axis m1 in response to cooling, may be used as each actuator member 21, 22, 24.

In the case where the material, which is other than the polymer fibers, is used as the material of the actuator members 21, 22, 24, a first drive device and a second drive device, each of which can supply energy for deforming the corresponding actuator member, may be used in place of the first heater 61 and the second heater 62. That is, an appropriate device, which can displace the drive subject 30 in the deforming direction of the actuator member through the application of the energy to the actuator member, may be used as the first drive device. Furthermore, an appropriate device, which can displace the drive subject 30 in the opposite direction that is opposite from the deforming direction of the actuator member through the application of the energy to the actuator member, may be used as the second drive device.

The means and/or functions provided by the controller 70 may be provided by a software stored in a tangible storage device and a computer executing the software, or the software alone, or the hardware alone, or a combination thereof. For example, in the case where the controller 70 is implemented by an electronic circuit, which is the hardware, this electronic circuit may be implemented by a digital circuit including a plurality of logic circuits, or an analog circuit.

The present disclosure should not be limited to the above-described specific examples. Modifications, which can be appropriately design modified by a person skilled in the art, may be also included in the scope of the present disclosure as long as they have the feature(s) of the present disclosure. The elements, the arrangement of the elements, the conditions, the shapes, and the like of each specific example described above are not necessarily limited to those exemplified and can be appropriately changed. A combination of the respective elements included in each of the above-described specific examples can be appropriately changed as long as no technical inconsistency exists.

The invention claimed is:

1. An actuator device comprising:
a first actuator member that is configured to be deformed in a first direction in response to application of heat energy to the first actuator member through heating;
a second actuator member that is configured to be deformed in a second direction in response to application of heat energy to the second actuator member through heating;
a drive subject that is coupled to the first actuator member and the second actuator member, wherein the drive subject is configured to be displaced in the first direction in response to the deformation of the first actuator member in the first direction and is also configured to be displaced in the second direction in response to the deformation of the second actuator member in the second direction;
a first drive device that is configured to heat the first actuator member and thereby displace the drive subject in the first direction;
a second drive device that is configured to heat the second actuator member and thereby displace the drive subject in the second direction;
a position sensor device that is configured to sense a position of the drive subject;
a controller that is configured to control the first drive device and the second drive device;
a first temperature sensor device that is configured to sense a temperature of the first actuator member;
a second temperature sensor device that is configured to sense a temperature of the second actuator member;
an environmental temperature sensor device that is configured to sense an environmental temperature, which is a temperature around the first actuator member and the second actuator member; and
an environmental humidity sensor device that is configured to sense an environmental humidity, which is a humidity around the first actuator member and the second actuator member, wherein:
the controller is configured to control the first drive device and the second drive device based on:
a difference between a target position of the drive subject and the position of the drive subject that is sensed by the position sensor device;
the temperature of the first actuator member;
the temperature of the second actuator member;
the environmental temperature; and
the environmental humidity.

2. The actuator device according to claim 1, wherein:
the controller is configured to estimate:
a first expected post-heating temperature that is an expected temperature of the first actuator member that is expected to be reached after the heating of the first actuator member by the first drive device; and
a second expected post-heating temperature that is an expected temperature of the second actuator member that is expected to be reached after the heating of the second actuator member by the second drive device; and
the controller is configured to temporarily stop the heating of the first actuator member and the second actuator member by the first drive device and the second drive device when the controller determines that one of the first expected post-heating temperature and the second expected post-heating temperature is increased beyond a predetermined temperature threshold.

3. The actuator device according to claim 1, wherein:
the controller is configured to estimate:
- a first expected internal stress that is expected to be generated at the first actuator member when the first actuator member is heated by the first drive device; and
- a second expected internal stress that is expected to be generated at the second actuator member when the second actuator member is heated by the second drive device; and the controller is configured to limit a heating amount, which is applied from the first drive device to the first actuator member, when the controller determines that the first expected internal stress is increased beyond a predetermined stress threshold; and the controller is configured to limit a heating amount, which is applied from the second drive device to the second actuator member, when the controller determines that the second expected internal stress is increased beyond the predetermined stress threshold.

4. The actuator device according to claim 1, further comprising:
- a housing that receives the first actuator member, the second actuator member and the drive subject in an inside of the housing and is to be fixed to a predetermined fixation member; and
- a thermal insulator that is placed between the predetermined fixation member and the housing.

5. The actuator device according to claim 1, wherein the first actuator member and the second actuator member are respectively made of polymer fiber.

6. The actuator device according to claim 1, wherein the first actuator member and the second actuator member are respectively made of a shape memory alloy.

* * * * *